(12) United States Patent
Ashley et al.

(10) Patent No.: US 10,224,728 B1
(45) Date of Patent: Mar. 5, 2019

(54) UNIVERSAL TOTABLE BATTERY BACKUP

(71) Applicant: M-Edge International Corp., Hanover, MD (US)

(72) Inventors: Adam R. Ashley, Crownsville, MD (US); Joshua B. King, Linthicum Heights, MD (US)

(73) Assignee: M-EDGE INTERNATIONAL CORP., Hanover, MD (US)

( * ) Notice: Subject to any disclaimer, the term of this patent is extended or adjusted under 35 U.S.C. 154(b) by 0 days.

(21) Appl. No.: 15/694,042

(22) Filed: Sep. 1, 2017

(51) Int. Cl.
*H02J 7/00* (2006.01)

(52) U.S. Cl.
CPC .......... *H02J 7/0044* (2013.01); *H02J 7/0054* (2013.01)

(58) Field of Classification Search
CPC .............................. H02J 7/0044; H02J 7/0054
USPC ...... 320/103; 455/575.1, 575.3, 575.4, 575.6
See application file for complete search history.

(56) References Cited

U.S. PATENT DOCUMENTS

| | | | | |
|---|---|---|---|---|
| 4,748,344 | A * | 5/1988 | Sing | F21L 15/10 307/149 |
| 6,922,876 | B2 * | 8/2005 | Kobayashi | B60R 11/02 24/633 |
| 9,210,492 | B2 * | 12/2015 | Dave | H04R 1/086 |
| 9,602,639 | B2 * | 3/2017 | Carnevali | H04M 1/0254 |
| 2005/0257348 | A1 * | 11/2005 | Byers | B65D 63/109 24/16 R |
| 2007/0215663 | A1 * | 9/2007 | Chongson | A45C 1/04 224/650 |
| 2007/0279852 | A1 * | 12/2007 | Daniel | A44C 5/0007 361/679.03 |
| 2008/0017678 | A1 * | 1/2008 | Anderson | A44C 5/003 224/221 |
| 2010/0032462 | A1 * | 2/2010 | Cameron | A45C 11/00 224/222 |
| 2013/0088185 | A1 * | 4/2013 | Rapoport | H02J 7/34 320/103 |
| 2013/0234644 | A1 * | 9/2013 | Weeks | H02J 7/0045 320/101 |
| 2014/0159640 | A1 * | 6/2014 | Yoshikawa | H02J 7/0044 320/103 |
| 2014/0159645 | A1 * | 6/2014 | Wyskiel | H02J 7/0055 320/107 |
| 2014/0375246 | A1 * | 12/2014 | Boysen, III | H02J 5/005 320/101 |

(Continued)

*Primary Examiner* — Nathaniel Pelton
(74) *Attorney, Agent, or Firm* — Christopher J. Scott

(57) ABSTRACT

A totable ensemble is attachable to a plurality of totable objects for re-charging peripheral power sources such as mobile communications devices thereby. The totable power source ensemble includes a primary power bank and a mechanism for attaching the primary power bank to a wide variety of totable objects such as backpacks, purses, and hand luggage. The primary power bank basically includes a battery and a mechanism for accessing power stored by the battery. The mechanism for attaching the primary power bank to a totable object may include an assembly-receiving pocket or other structure that provides matable attachments for attaching the assembly-receiving pocket or other structure to an attachment structure associated with each totable object. The battery is thus made accessible upon the totable object and the attachment mechanism enables the user to attach and re-attach the ensemble to any number of totable objects for ease of device recharge-ability.

7 Claims, 15 Drawing Sheets

(56) References Cited

U.S. PATENT DOCUMENTS

| | | | | |
|---|---|---|---|---|
| 2015/0155730 A1* | 6/2015 | Miller | H02J 7/0054 |
| | | | 320/114 |
| 2015/0326044 A1* | 11/2015 | Ashley | H02J 7/0054 |
| | | | 320/103 |
| 2016/0072536 A1* | 3/2016 | Wang | H02J 7/025 |
| | | | 455/566 |
| 2016/0094079 A1* | 3/2016 | Hiroki | H02J 7/025 |
| | | | 320/101 |
| 2016/0322844 A1* | 11/2016 | Pickens | H02J 7/0044 |
| 2017/0019062 A1* | 1/2017 | Delacerda | H02S 20/00 |
| 2017/0245567 A1* | 8/2017 | Fathollahi | H02J 7/0042 |
| 2017/0271892 A1* | 9/2017 | Cross | H04M 19/08 |
| 2017/0297658 A1* | 10/2017 | Mullikin | B63B 21/20 |
| 2017/0357214 A1* | 12/2017 | Choi | G04B 37/14 |
| 2017/0359452 A1* | 12/2017 | Enojado | H04M 1/0202 |
| 2018/0081393 A1* | 3/2018 | Choi | G06F 1/1635 |

* cited by examiner

FIG 2
FIG 3
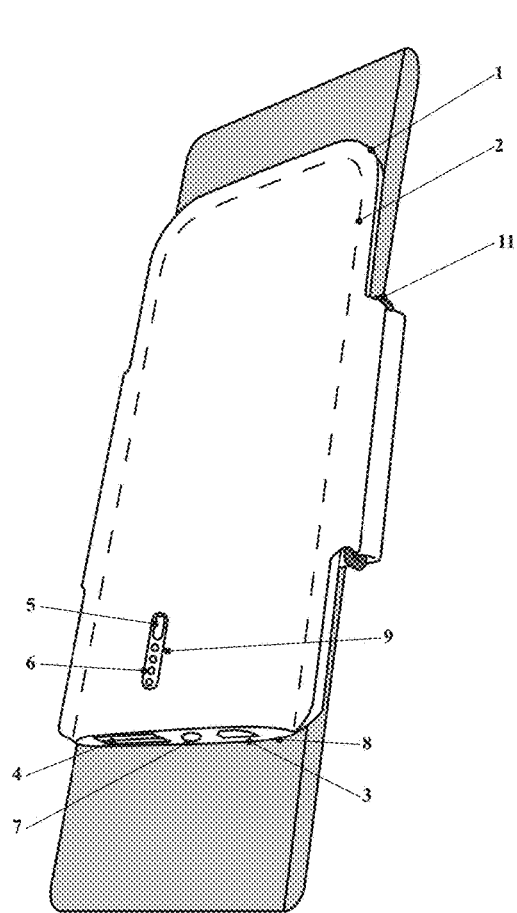
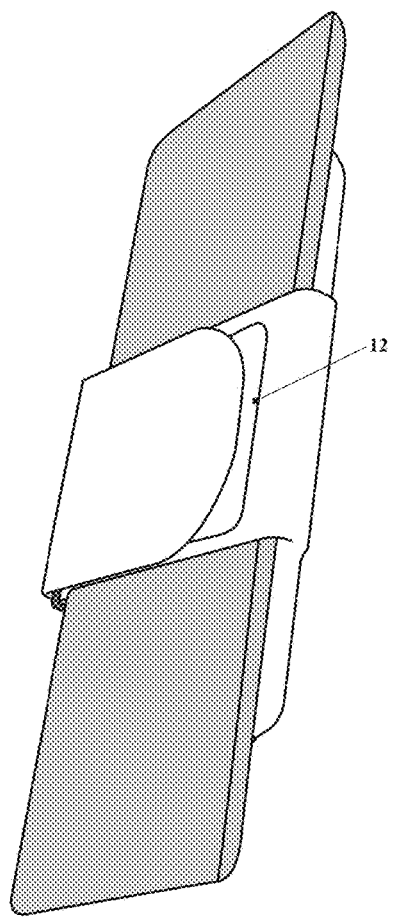

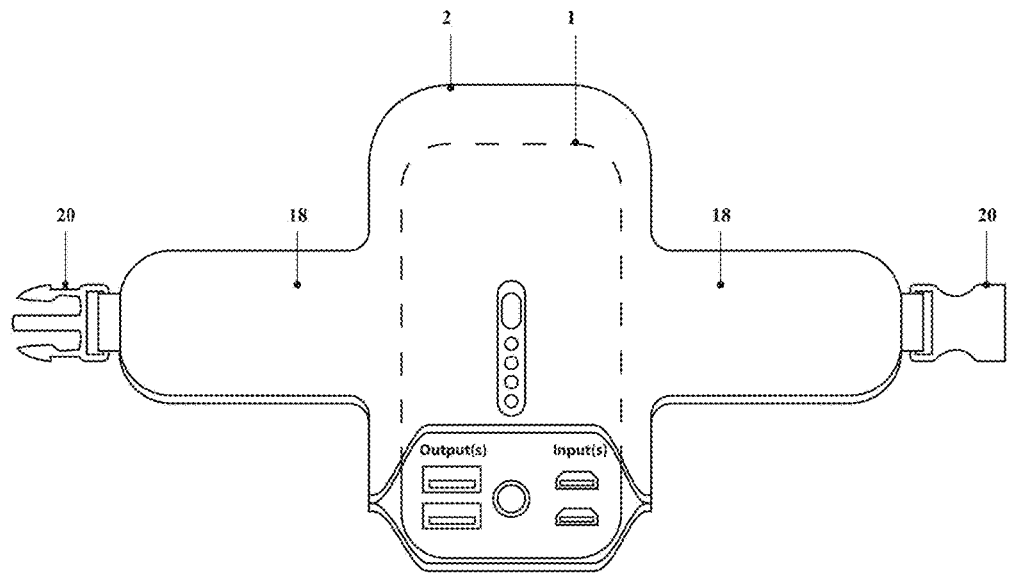
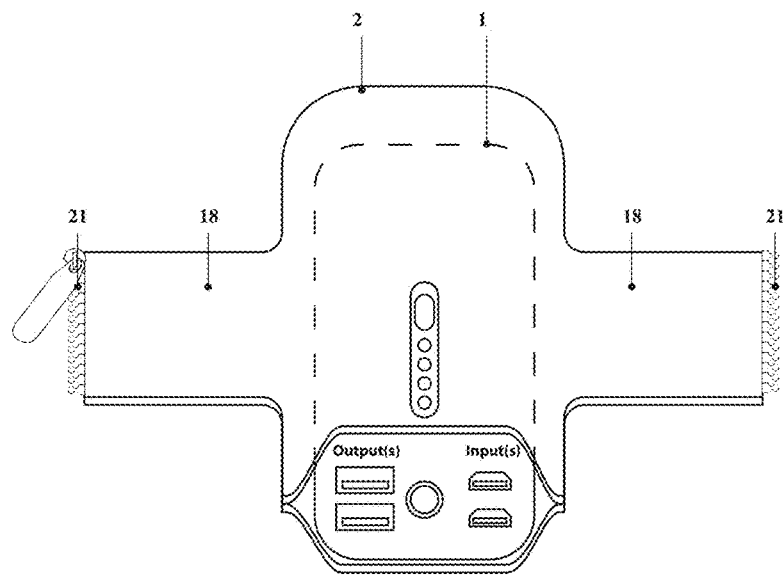

FIG 7
FIG 8
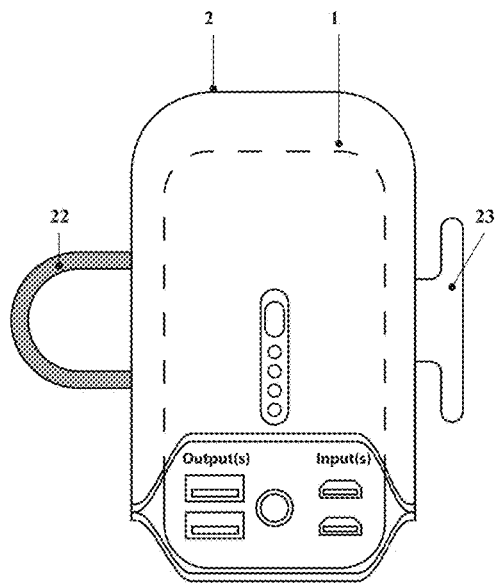
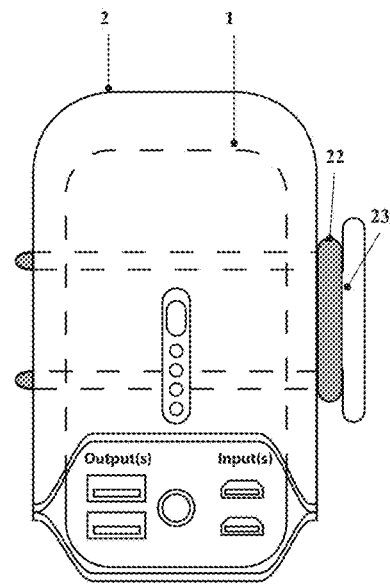

FIG 12
FIG 13
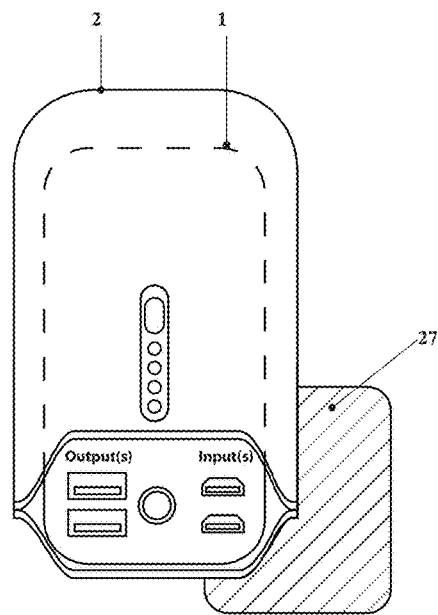
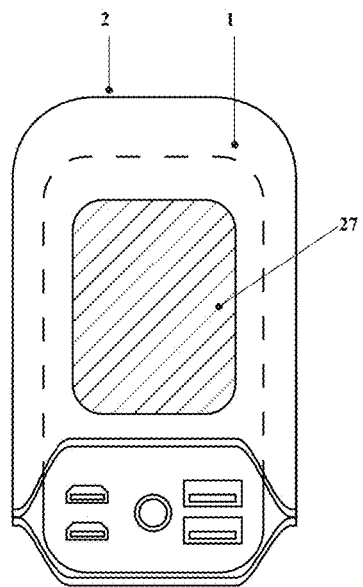

US 10,224,728 B1

UNIVERSAL TOTABLE BATTERY BACKUP

FIELD OF THE INVENTION

The present invention relates to a charging device for electronic devices attached to a bag or other carrying case.

BACKGROUND OF THE INVENTION

The internal batteries on many mobile electronic devices (smart phones, tablets, cameras, etc.) have limited battery life and frequently need to be charged throughout the day or the device would otherwise run out of power and cease to function. Additionally, a convenient charging source (wall outlet) is not always available especially when users are commuting to and from school and/or work.

When a user is away from a wall-outlet, or car adapter, back-up batteries are available and can be used to recharge mobile devices. However, the process of charging the device while using a backup battery is not convenient as these batteries are bulky and difficult to hold while using the device.

Furthermore, these mobile electronic devices have become smaller and more portable, and bags, luggage, cases, and other products have been provided to allow users to more conveniently carry their devices. Bags have been provided with a battery and corresponding interface included on the inside of the bag allowing users to charge their devices only when the devices are positioned inside the bag.

Therefore, in order to charge their electronic devices with such bags, users would need to open the bag to access the battery and its corresponding interface to plug in their electronic devices. This makes using the electronic device while charging more difficult. It also is inconvenient for users to charge the electronic device because users would need to take off their bag in order to open it and access the battery.

Some other bags have become available which address this problem by moving the charging interface to the exterior of the bag with the most convenient location for the interface being on the shoulder strap of the bag where the user can conveniently charge their device and/or the battery. However, bags are often considered by users to be fashion accessories. Users have a wide range of specific preferences in bag style, color, material, construction, key features, etc. Thus, it is currently impractical for each bag type to include a backup battery due to the high cost of this component.

SUMMARY OF THE INVENTION

The present invention describes a charging device including a mechanism to attach this device to the shoulder strap of most bags such that the input port and the output port of the charging interface are accessible from the exterior of the bag. This charging device easily attaches to nearly any bag and can be conveniently located allowing the user to charge their mobile device while comfortably using it.

BRIEF DESCRIPTION OF THE SEVERAL VIEWS OF THE DRAWINGS

FIG. 2 is a diagram depicting the first alternative embodiment of the universal charging device with an attachment mechanism attached to a totable structure with an isometric view of a first side of an attachment structure of the totable structure.

FIG. 3 is a diagram depicting the first alternative embodiment of the universal charging device with attachment mechanism attached to a totable structure with an isometric view of a second side of the attachment structure of the totable structure.

FIG. 5 is a diagram depicting a third alternative embodiment of the universal charging device with attachment mechanism.

FIG. 6 is a diagram depicting a fourth alternative embodiment of the universal charging device with attachment mechanism.

FIG. 7 is a diagram depicting a fifth alternative embodiment of the universal charging device with attachment mechanism shown in a first condition of use.

FIG. 8 is a diagram depicting the fifth alternative embodiment of the universal charging device with attachment mechanism shown in a second condition of use.

FIG. 12 is a diagram depicting a first side of an eighth alternative embodiment of the universal charging device with attachment mechanism exploded therefrom.

FIG. 13 is a diagram depicting a second side of the eighth alternative embodiment of the universal charging device with attachment mechanism attached thereto.

DETAILED DESCRIPTION OF THE PREFERRED EMBODIMENTS

A universal backup battery according to the present application provides a convenient system for charging electronic devices. According to various embodiments, a universally totable backup battery is provided with a primary power bank and an attachment interface assembly with an attachment mechanism that allows the user to charge an electronic device while the battery is securely attached to a totable structure. The attachment mechanism allows the user to securely attach the battery to their totable structure in an orientation that is most convenient for them to charge their device while using it.

Figure 1:
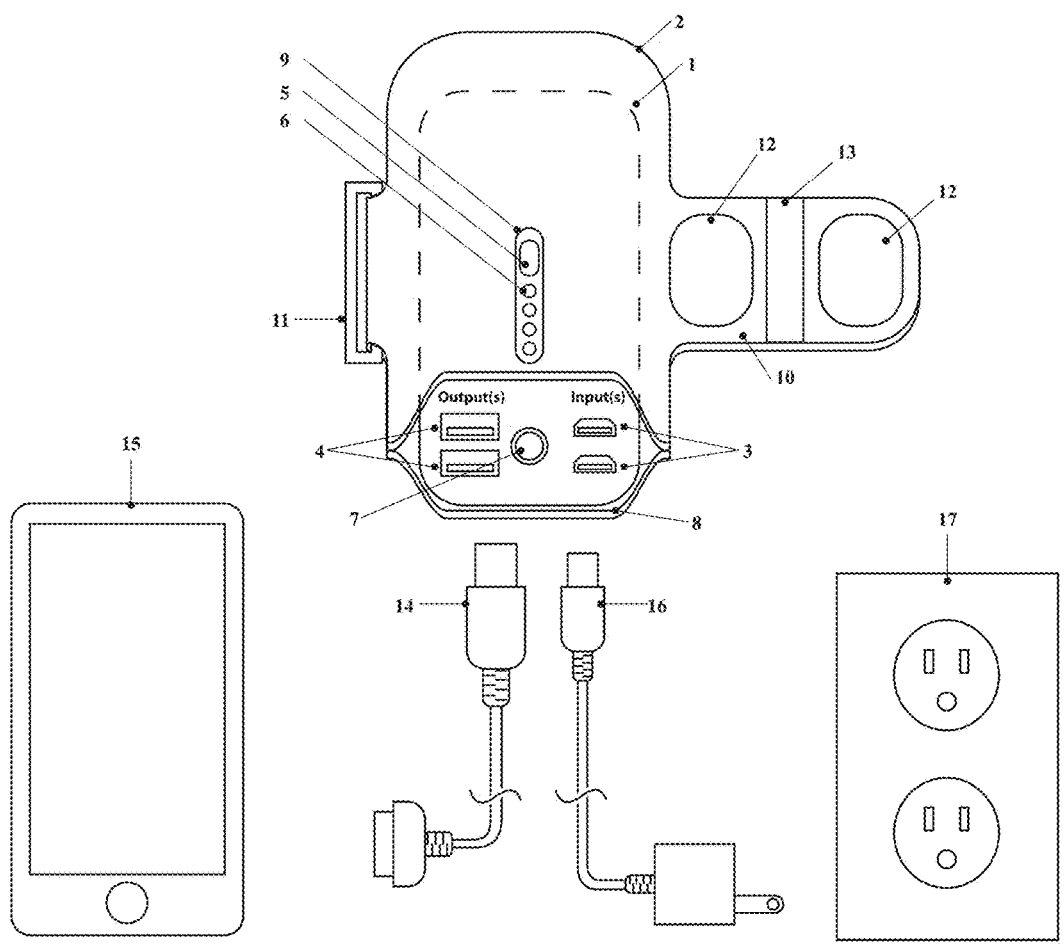
FIG. 1 is a diagram depicting electrical connections of a universal charging device and attachment mechanism according to a first alternative embodiment of the universal charging device.

In an embodiment shown in FIG. 1, the invention provides a primary power bank (1) and an attachment interface assembly (2). The primary power bank (1) may include one or more input ports (3) for charging the primary power bank, one or more output ports (4) for charging mobile devices (as at 15), one or more buttons (5) for controlling the primary power bank, one more illumination sources (6) for indicating the functions of the primary power bank, and one more flashlight illumination features (7).

The attachment interface assembly may preferably comprise an assembly-receiving pocket having a pocket mouth (8) providing access to one or more features of the primary power bank, as well as other openings (9) for access to other features of the primary power bank. The attachment interface assembly also may include certain attachment means for attaching the assembly-receiving pocket to an attachment structure associated with any number of totable objects or structures as exemplified in FIGS. 18-23.

In the embodiment shown in FIG. 1, the attachment means are exemplified by a matable mechanism characterized by a strap element (10) and a loop element (11). The strap element is (a) feedable through the loop element, (b) foldable back upon itself at the loop element, and (c) fastenable to itself via matable fastening means (12) such as hook and loop type fastening means outfitted upon a dorsal attachment surface of the strap element.

The matable structures may also include a resilient or elastic element or portion (13) that is actuable to resiliently engage the attachment structure for enhancing attachment to the totable structure. The embodiment shown in FIG. 1 includes an electrical diagram showing the input port(s) (3) of the primary power bank (1) connected via a wire or cable (16) to a power source (17) and the output ports (4) connected via a wire or cable (14) to a mobile device (15). These wires or cables may also be replaced with a wireless charging technology.

FIG. 2 shows the same embodiment of FIG. 1 with the power bank disposed inside the attachment interface assembly while securely attached to a generic attachment structure of a totable structure. FIG. 3 shows the same embodiment as FIGS. 1 and 2 shown from the opposite side of the attachment structure of the totable structure. The reader will note that the attachment structure comprises a girth about which the matable mechanism operates to attach the device.

Figure 4:
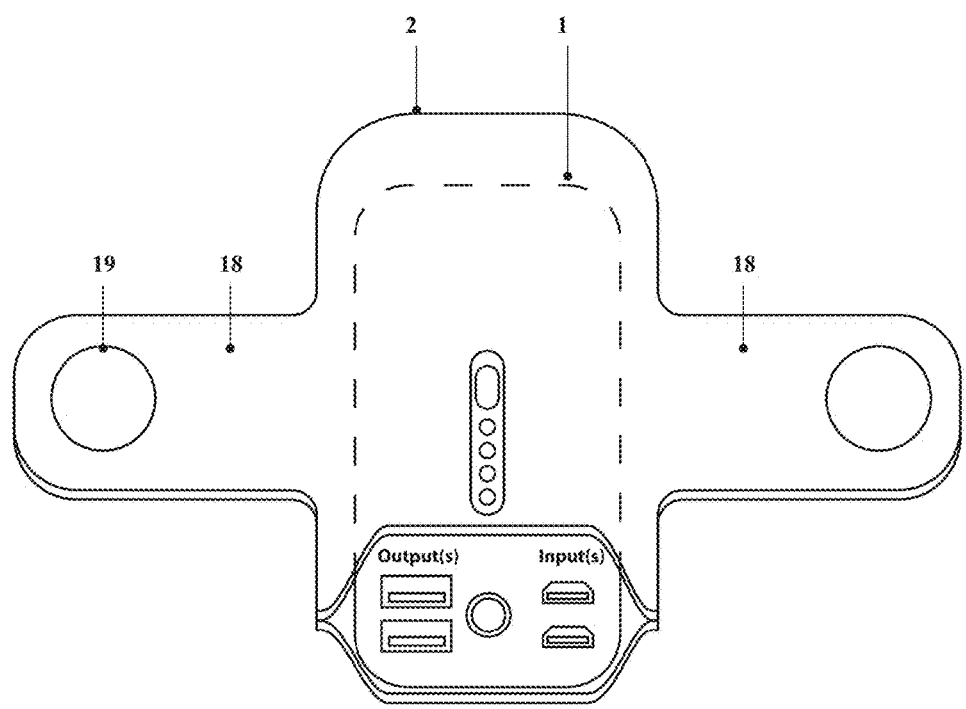
FIG. 4 is a diagram depicting a second alternative embodiment of the universal charging device with attachment mechanism.

In another embodiment as exemplified by the embodiment shown in FIG. 4, certain attachment means may function to attach the assembly-receiving pocket to the attachment structure and be characterized by comprising first and second matable structures (18) extending laterally from the assembly-receiving pocket. The first and second matable structures are cooperable to attach the attachment interface assembly to the attachment structure about the girth and may be outfitted with certain fastening means (19) that securely engage the two matable structures. The fastening means may be exemplified by snaps, buttons, VELCRO® brand hook and loop fastening structure, or other fastening elements.

In another embodiment shown in FIG. 5, the attachment means may be exemplified by first and second matable structures (18) that extend laterally from the assembly-receiving pocket. The first and second matable structures are cooperable to attach the attachment interface assembly to the attachment structure about the girth of an attachment structure associated with a totable object via fastening means (20) that securely engage the two matable structures. The fastening means (20) may be exemplified by a clip mechanism.

In another embodiment shown in FIG. 6, the attachment means (for attaching the assembly-receiving pocket to the attachment structure) being characterized by comprising first and second matable structures (18) extending laterally from the assembly-receiving pocket, the first and second matable structures being cooperable to attach the attachment interface assembly to the attachment structure about the girth via certain fastening means (21) that securely engage the two matable structures. The fastening means may preferably comprise a zipper mechanism.

In another embodiment shown in FIG. 7, the attachment interface assembly may preferably comprise certain attachment means characterized by at least at least one loopable member (22) and one protuberance (23) extending from opposite sides of the attachment interface assembly with the loopable member being loopable about the at least one protuberance and the attachment structure for attaching the primary power bank construction to the attachment structure. Referencing FIG. 8, the reader will consider the embodiment in FIG. 7 is depicted with the loopable member (22) engaged with the protuberance (23).

Figure 9:
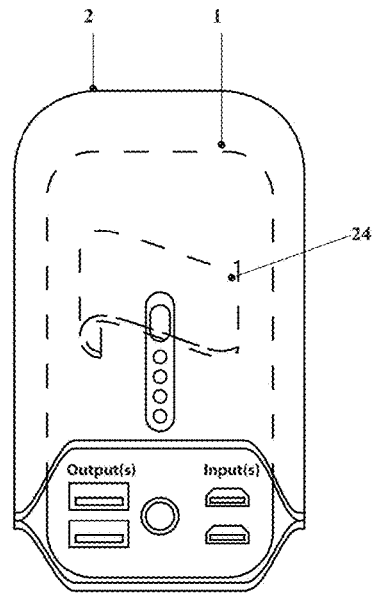
FIG. 9 is a diagram depicting a first side of a sixth alternative embodiment of the universal charging device with hidden attachment mechanism.
Figure 10:
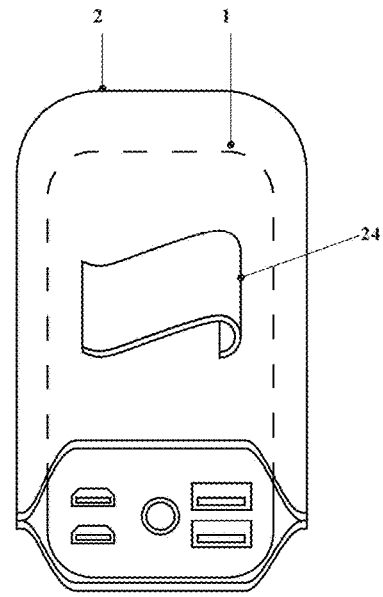
FIG. 10 is a diagram depicting a second side of the sixth alternative embodiment of the universal charging device with visible attachment mechanism.

In another embodiment shown in FIG. 9, the attachment interface assembly (2) preferably comprises an assembly receiving pocket outfitted with a clip mechanism (24) which may be used to secure the assembly to the attachment structure of a totable object or structure. In FIG. 10, the embodiment otherwise shown in FIG. 9 is depicted showing the reverse side where the clip mechanism (24) is attached to a ventral surface of the attachment interface assembly (2).

Figure 11:
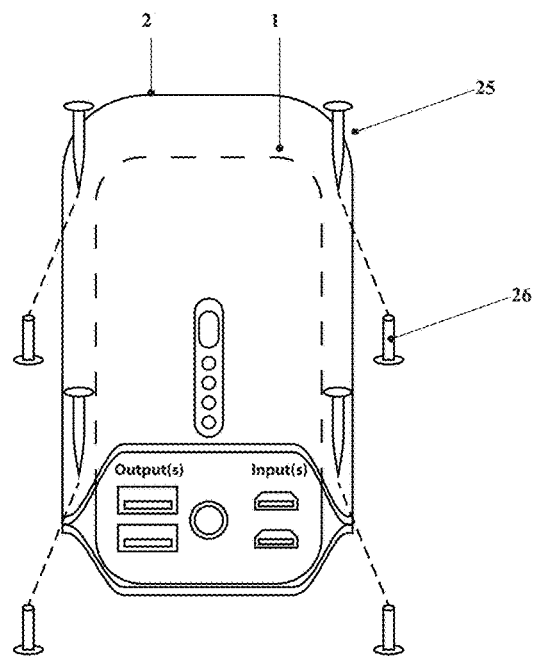
FIG. 11 is a diagram depicting a seventh alternative embodiment of the universal charging device with attachment mechanism.

In another embodiment shown in FIG. 11, the assembly-receiving pocket preferably comprises a peripheral flanged portion. FIG. 11 depicts the peripheral flanged portion being pierced via pins (25) for enabling the user to piercably attach the attachment interface assembly to the attachment structure of a totable object or structure. Pins (25) and pin-receiving features (26) may thus fasten the attachment interface assembly (2) to a totable object.

In another embodiment shown in FIG. 12, the assembly-receiving pocket may preferably be outfitted with a double-sided adhesive element (27). The double-sided adhesive element (27) may be utilized to adhesively attach the assembly-receiving pocket to an attachment structure of a totable object. FIG. 13 depicts the embodiment otherwise shown in FIG. 12 at a reverse or second side where the double-sided adhesive element (27).

Figure 14:
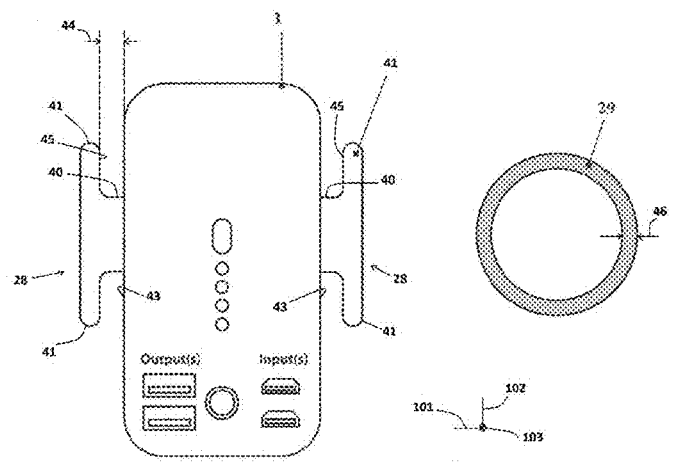
FIG. 14 is a diagram depicting a ninth alternative embodiment of the universal charging device with a first matable attachment mechanism exploded therefrom.
Figure 15:
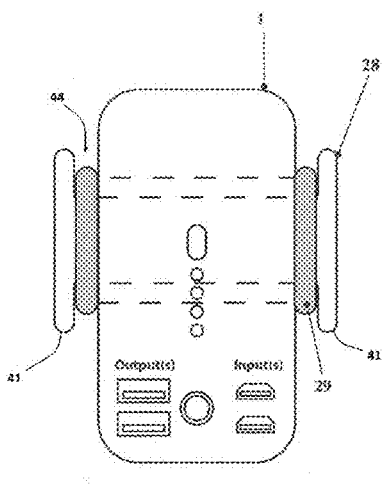
FIG. 15 is a diagram depicting a first side of the ninth alternative embodiment of the universal charging device with the first matable attachment mechanism attached to a second matable attachment mechanism.
Figure 16:
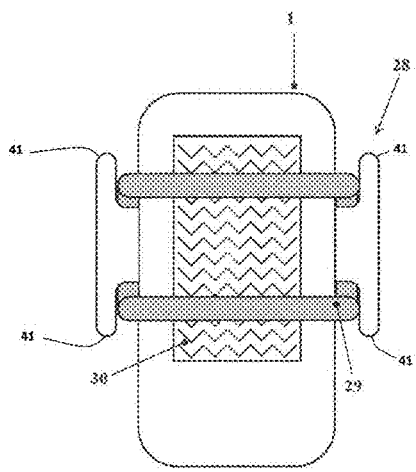
FIG. 16 is a diagram depicting a second side of the ninth alternative embodiment of the universal charging device with the first matable attachment mechanism attached to the second matable attachment mechanism.

In another embodiment shown in FIG. 14, the primary power bank construction (1) may preferably comprise multiple cleats (28) protruding from the lateral sides of the primary power bank construction and a loopable member (29) (e.g. a resilient O-ring element) for attaching the primary power bank construction to the attachment structure of a totable object. The loopable member (29) may be looped around the cleats (28) securing it to the totable structure. The loopable member (29) may be constructed of an elastic O-ring construction providing adequate force to securely attach the primary power bank to the totable structure. FIG. 15 depicts a first side of the ensemble showing the loopable member (29) attached to the cleats (28). FIG. 16 depicts the ensemble showing the reverse side.

The cleats or cleat members (28) each preferably comprise a central portion (40) that extend in a first dimension (101) and opposed end portions (41) that extend in a second dimension (102) parallel to the outer lateral portions (43) of the power bank construction (1). Referencing FIG. Nos. 14-16, it will be seen that a substantially uniform member-receiving space (44) is situated between the outer lateral portions (43) of the power bank construction (1) and inner portions (45) of the opposed end portions (41).

The loopable member (29) preferably has a member thickness or cross-sectional diameter (46). The member thickness (46) substantially fills the substantially uniform member-receiving space (44) in the first dimension (101) when being looped about the cleat members (28) and the attachment structure in the first dimension (101) and the second dimension (102), as well as the third dimension (103) extending into/out of the page for attaching the primary power bank construction (1) to the attachment structure.

Figure 17:
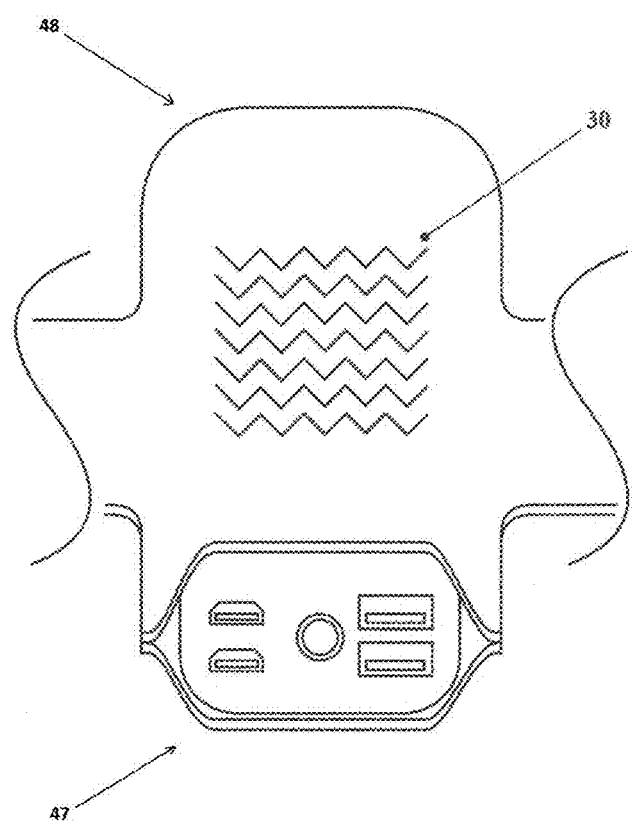
FIG. 17 is a diagram depicting a fragmentary universal charging device portion with friction-enhancing means shown outfitted upon a ventral surface of the fragmentary universal charging device portion.
Figure 18:
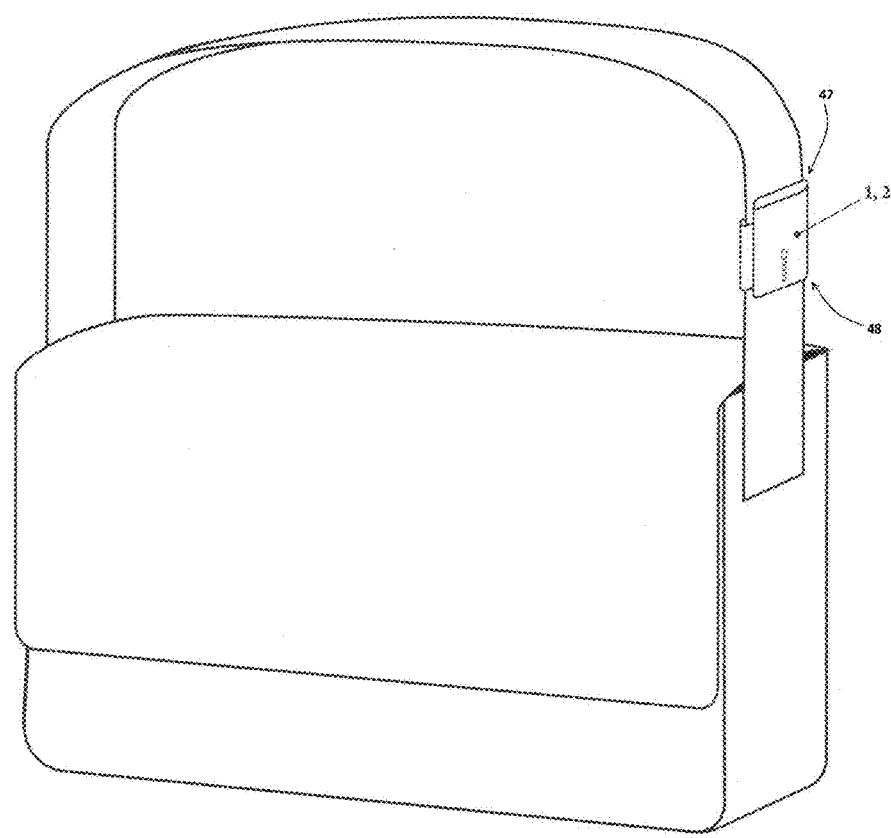
FIG. 18 is a diagram depicting a front perspective view of a first totable structure exemplified by a messenger-type bag shown outfitted with a generic embodiment of the combination primary power bank and attachment interface assembly that together form the universal charging device according to the present invention.
Figure 19:
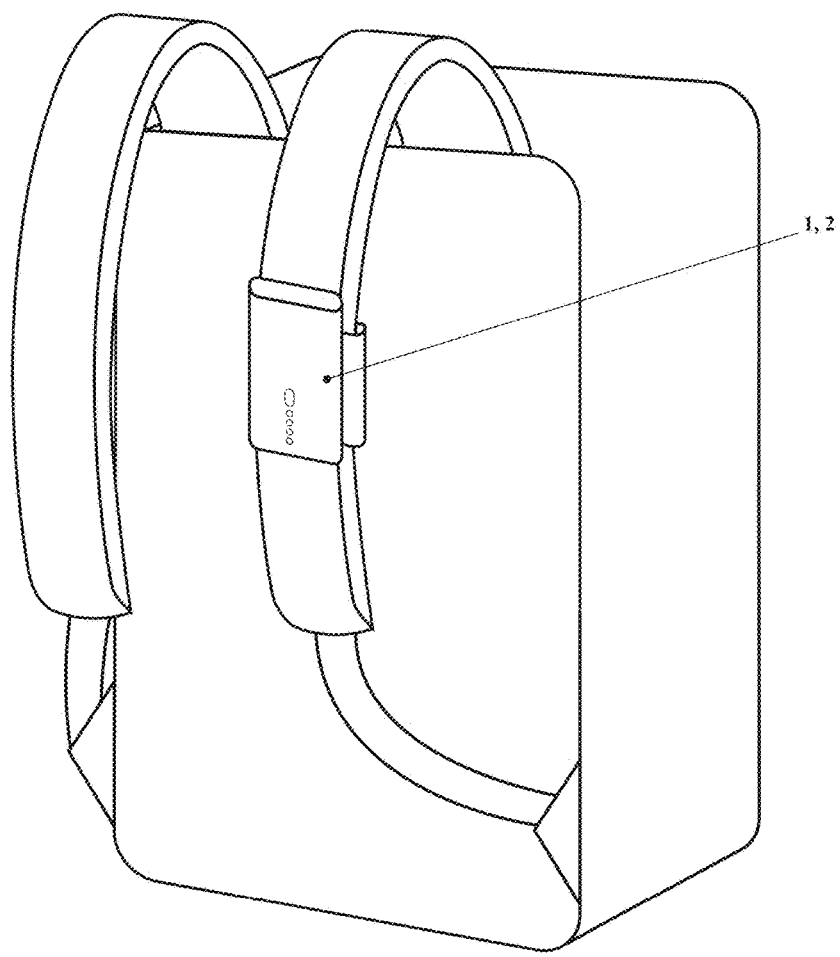
FIG. 19 is a diagram depicting a front perspective view of a second totable structure exemplified by a backpack-type bag shown outfitted with a generic embodiment of the combination primary power bank and attachment interface assembly that together form the universal charging device according to the present invention.
Figure 20:
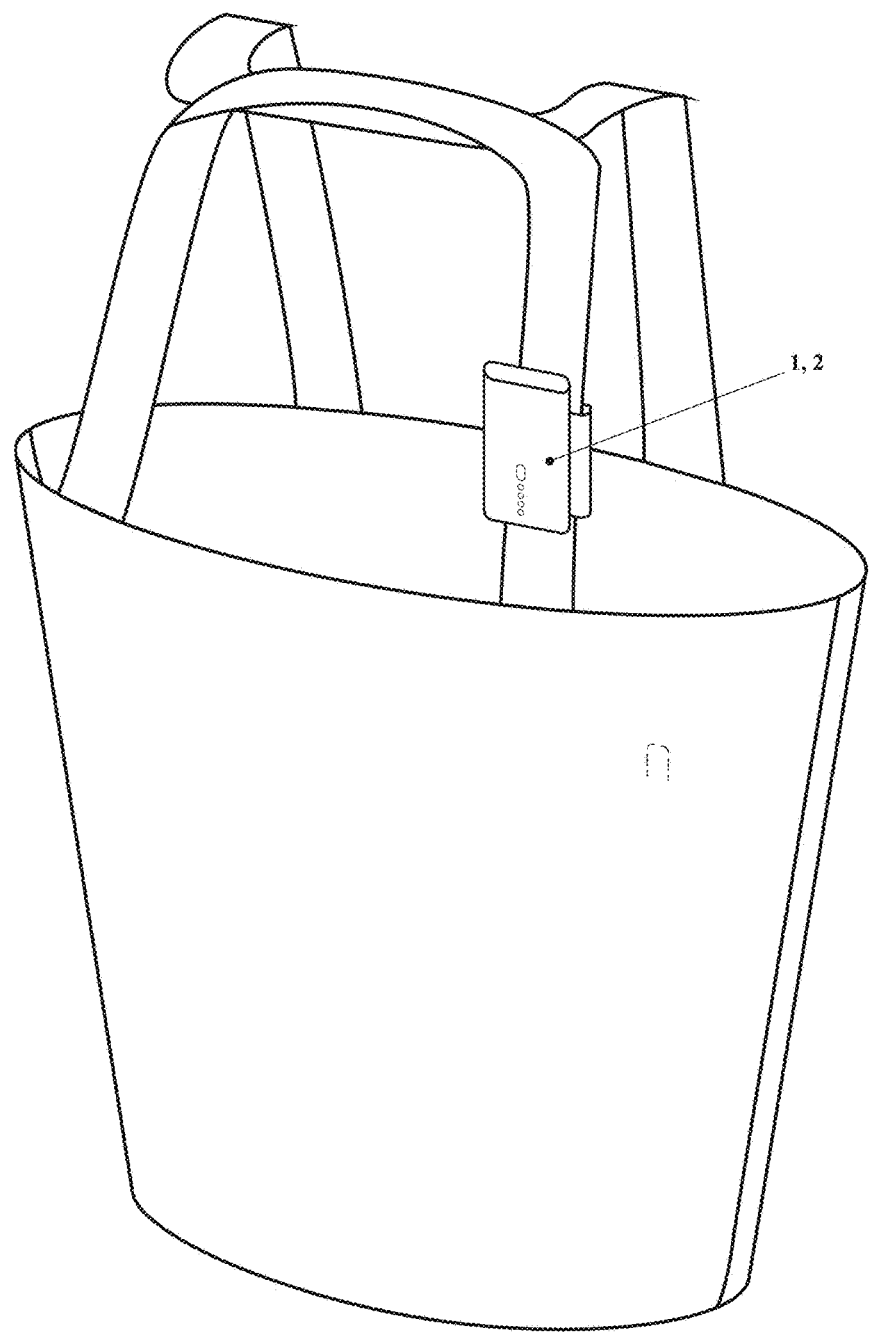
FIG. 20 is a diagram depicting a front perspective view of a third totable structure exemplified by a tote-type bag shown outfitted with a generic embodiment of the combination primary power bank and attachment interface assembly that together form the universal charging device according to the present invention.
Figure 21:
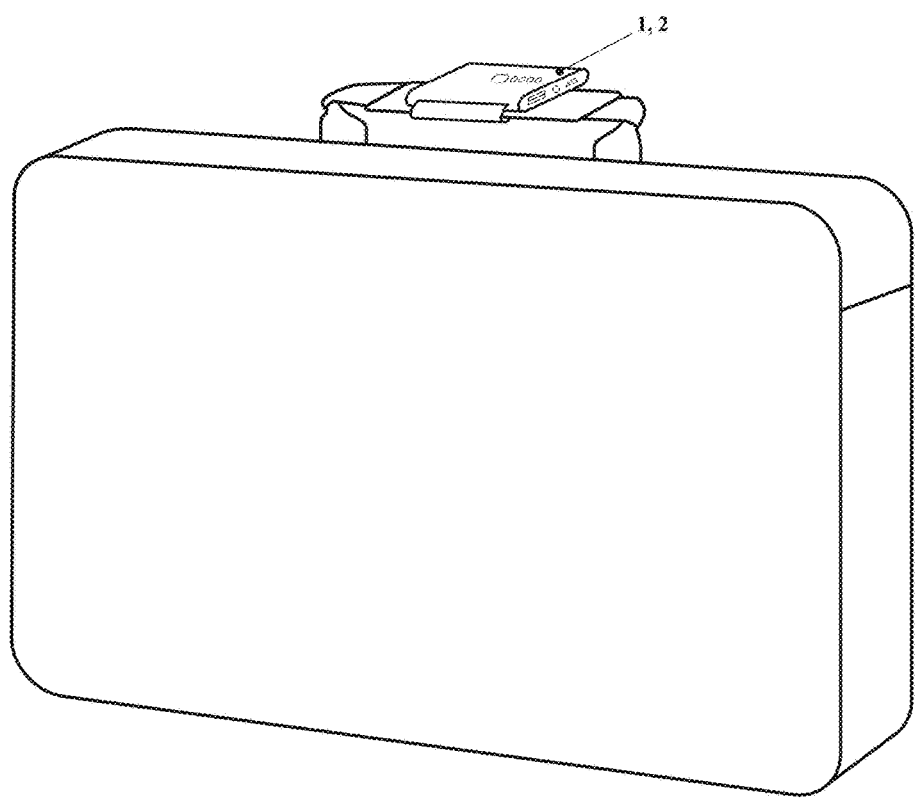
FIG. 21 is a diagram depicting a front perspective view of a fourth totable structure exemplified by a briefcase-type bag shown outfitted with a generic embodiment of the combination primary power bank and attachment interface assembly that together form the universal charging device according to the present invention.
Figure 22:
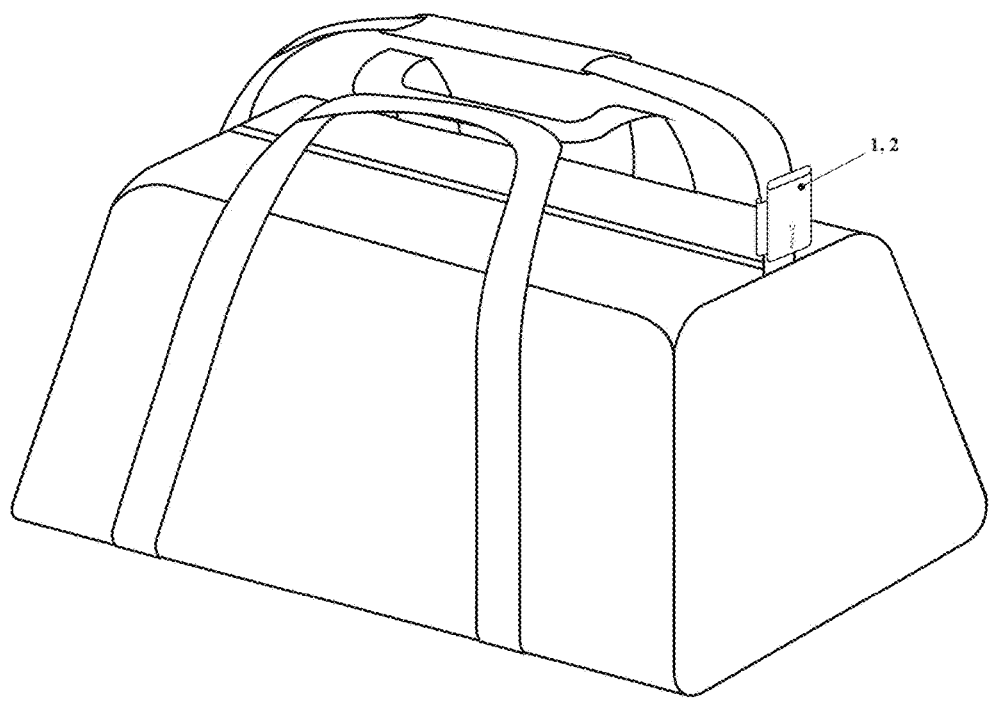
FIG. 22 is a diagram depicting a front perspective view of a fifth totable structure exemplified by a duffle-type bag shown outfitted with a generic embodiment of the combination primary power bank and attachment interface assembly that together form the universal charging device according to the present invention.
Figure 23:
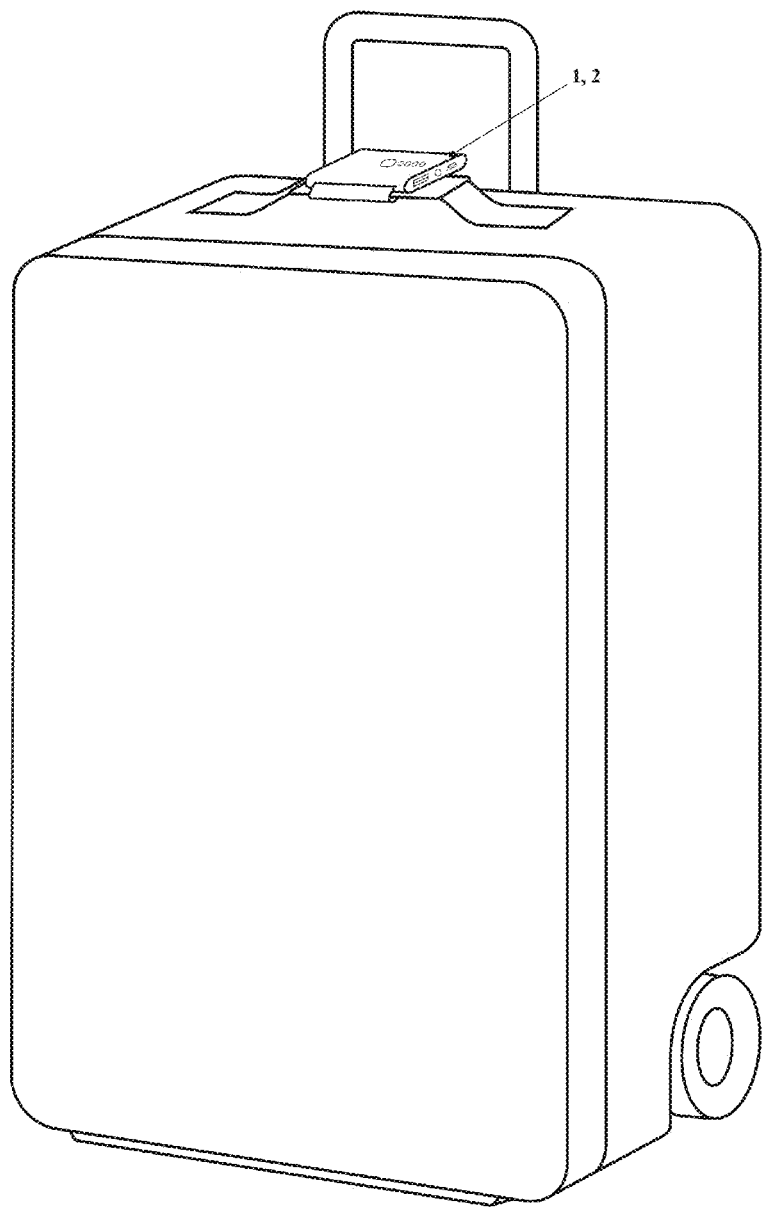
FIG. 23 is a diagram depicting a front perspective view of a sixth totable structure exemplified by a luggage-type bag shown outfitted with a generic embodiment of the combination primary power bank and attachment interface assembly that together form the universal charging device according to the present invention.

FIG. 17 illustrates a feature that may be included in multiple embodiments, wherein the assembly-receiving pocket comprises a ventral surface (30). The ventral surface (30) may preferably comprise certain friction-enhancing means exemplified by textured surfacing extending in the third dimension (103) for increasing the coefficient of friction between the ventral surface (30) and an outer structural surface of the attachment structure. It is contemplated that the friction-enhancing means may well operate to retard motion of the ventral surface relative to the outer structural surface.

The reader will further note the pocket mouth (8) is located at an open first end (47) of the assembly-receiving pocket opposite a second closed end (48), which first end (47) provides access to one or more features of the primary power bank (1) at the first end (47) as well as other openings (9) for access to other features of the primary power bank (1). The assembly-receiving pocket is preferably orientable such that the first end (47) is a lower end and the second end (48) is an upper end as generally and comparatively depicted in FIG. Nos. 17 and 18. The primary power bank (1) is preferably retained by the assembly-receiving pocket when the first end (47) is the lower end.

While the above descriptions contain much specificity, this specificity should not be construed as limitations on the scope of the invention, but rather as an exemplification of the invention. In certain alternative embodiments, the basic invention may be said to essentially teach or disclose a first totable power source ensemble for attachment to a plurality of totable objects as generally depicted in FIGS. 18-23 for configuring a totable power source upon the totable objects and for re-charging peripheral power sources such as mobile phones and the like.

The totable power source ensemble according to the present invention may thus be said to essentially and preferably comprise a primary power bank as at (1) and an attachment interface assembly as at (2). The primary power bank preferably comprises certain power output means exemplified by output port(s) (4) and a primary power source typified by a (rechargeable) battery. The power output means are in electrical communication with the primary power source for enabling output access to the primary power source.

The attachment interface assembly preferably comprises an assembly-receiving pocket and certain attachment means as various exemplified for attaching the assembly-receiving pocket to an attachment structure (e.g. a strap or handle) associated with each totable object. The primary power bank is received in the assembly-receiving pocket, and the attachment means are operable to attach the assembly-receiving pocket to the attachment structure. The power output means are thus positioned at the site of attachment upon the attachment structure for providing output access to the primary power source via the assembly-receiving pocket for re-charging a select peripheral power source.

The power output means may be preferably characterized by at least one power output interface as at output ports (4) as generally shown in the figures, and the assembly-receiving pocket comprises a pocket mouth as at (8). The power output interface(s) are preferably positioned adjacent the pocket mouth (8) for enabling the user to access the primary power source via the pocket mouth (8) and at least one power output interface or port (4) for re-charging the select peripheral power source or mobile phone (15).

The primary power bank may preferably comprise certain power input means in communication with the primary power source for enabling the user to re-charge the primary power source via an external power source as at (17). The assembly-receiving pocket comprises certain means for enabling the user to re-charge the primary power source via the external power source while the primary power bank is received within the assembly-receiving pocket.

In this regard, the power input means may be preferably characterized by at least one power input interface as at input port(s) (3). As with the power output interface, the at least one power input interface is preferably positioned adjacent the pocket mouth (8) for enabling the user to access the primary power source via the pocket mouth (8) for enabling the user to re-charge the primary power source via the external power source (17).

Noting that the attachment structure(s) of the totable objects or structure are exemplified by straps and handles, it will be further understood that each may preferably comprise a certain girth. The attachment means attach the assembly-receiving pocket to the attachment structure and are preferably characterized by comprising first and second matable structures extending laterally from the assembly-receiving pocket, and are cooperable to attach the attachment interface assembly to the attachment structure about the girth.

The assembly-receiving pocket may preferably comprise a ventral surface (30) outfitted with or comprising certain friction-enhancing means such as textured surfacing for increasing the coefficient of friction between the ventral surface (30) and an outer structural surface of the attachment structure. The friction-enhancing means are provided to retard motion of the ventral surface (30) relative to the outer structural surface when in engagement therewith.

The primary power bank may preferably comprise at least one exterior illumination source as at (6) and the assembly-receiving pocket may preferably comprise a dorsal surface outfitted with an aperture or opening as at (9), which opening (9) may exemplify certain means for enabling the user to visualize the at least one exterior illumination source. The at least one exterior illumination source is in communication with the primary power source for visually indicating to the user certain attributes of the primary power source such as power level or active state.

The at least one exterior illumination source may be characterized by having a protruding length, and the opening (9) may thus let the protrusion length. The assembly-receiving pocket may preferably comprise a certain (resilient) material thickness of sufficient dimension to surround at least a portion of the protrusion length for protecting the at least a portion of the protrusion length and streamlining the totable power source ensemble. A tip of the protrusion length may preferably positioned so as to be flush with an outer pocket surface of the assembly-receiving pocket for further streamlining the totable power source ensemble (not specifically illustrated).

A select matable structure as selected from the group consisting of the first and second matable structures may preferably comprise a resilient element. The resilient element of the select matable structure is actuable to resiliently engage the attachment structure for enhancing attachment of the attachment interface assembly to the attachment structure by forcing the attachment interface assembly toward the attachment structure under resilient return of the resilient member toward its relaxed state.

The assembly-receiving pocket comprises a resilient material thickness that is itself actuable or compressible for enabling the user to conform an outer pocket surfacing of the assembly-receiving pocket to an outer structural surface of the attachment structure for streamlining the totable power source ensemble relative to the attachment structure. Further, the primary power bank may itself be flexible or conformable to the outer structural surface via the resilient material thickness for further streamlining the totable power source ensemble relative to the attachment structure.

The totable power source ensemble may comprise a number of other optional features, including having waterproof aspects for increasing totability of the totable power source ensemble; button means for manually controlling functionality of the primary power bank; data storage means; a flashlight illumination source; and a preferred first embodiment wherein the first and second matable structures are characterized by a strap element and a loop element.

A preferred second embodiment may be said to provide a second totable power source ensemble for attachment to a plurality of totable objects for configuring a totable power source upon the totable objects and for re-charging peripheral power sources thereby. In this regard, the second totable power source ensemble may be said to essentially and preferably comprise a primary power bank construction and secondary or second mate means separated from the primary power bank construction.

The primary power bank construction preferably comprises a primary power source, certain power output means, and primary or first mate means separate from the secondary or second mate means. The primary or first mate means help to matably attach the primary power bank construction to an attachment structure associated with each totable object. The power output means are in communication with the primary power source for enabling output access to the primary power source.

The secondary or second mate means also help to matably attach the primary power bank construction to the attachment structure. In this regard, the first and second mate means are matable for cooperably attaching the primary power bank construction to the attachment structure, and the power output means provide output access to the primary power source for re-charging a select peripheral power source.

The first mate means may be preferably characterized by at least one protuberance extending from the primary power bank construction and the second mate means may be preferably characterized by at least one loopable member. The loopable member is loopable about the at least one protuberance and the attachment structure for attaching the primary power bank construction to the attachment structure. The at least one protuberance may be characterized by at least one or more cleat members that preferably extend in opposite directions from opposed lateral portions of the primary power bank construction.

The loopable member may be preferably characterized by an integrally looped member having an arc length of 360 degrees when placed into a circular orientation. The looped member thus has opposed portions characterized by a zero point of reference and a point opposite the zero point of reference at 180 degrees from the zero point of reference. The zero point of reference and the point opposite the zero point of reference are loopable about the two cleat members. The integrally looped member is preferably resilient so as to be resiliently actuable for engaging the attachment structure and resiliently returnable for forcing the primary power bank construction into engagement with the attachment structure.

The totable power source ensemble may further provide a primary power bank construction having a first power bank portion and a second power bank portion. The first power bank portion may be said to preferably comprise the primary power source and power output means while the second power bank portion preferably comprises the first mate means. The first power bank portion is selectively separable from the second power bank portion for selectively separating the primary power source from the first mate means.

Accordingly, although the invention according to the present invention have been described by reference to a number of different embodiments, it is not intended that the novel combinations or assemblies be limited thereby, but that modifications thereof are intended to be included as falling within the broad scope and spirit of the foregoing disclosure, the appended drawings, and the following claims.

What is claimed is:

1. A totable power source ensemble for attachment to a plurality of totable objects for configuring a totable power source upon the totable objects and for re-charging peripheral power sources thereby, the totable power source ensemble comprising:

a primary power bank construction, the primary power bank construction comprising a primary power source, a power output interface, opposed lateral portions, and integrally formed first and second cleat members extending laterally from the opposed lateral portions in a first dimension, the power output interface being in communication with the primary power source for enabling output access to the primary power source; and at least one loopable member for matably attaching the primary power bank construction to the attachment structure in cooperative association with the first and second cleat members, the first and second cleat members and at least one loopable member thus being matable for cooperably attaching the primary power bank construction to the attachment structure, the power output interface for providing output access to the primary power source for re-charging a select peripheral power source.

2. The totable power source ensemble of claim 1 wherein the first and second cleat members each comprise a central portion extending in the first dimension and opposed end portions extending in a second dimension parallel to the lateral portions, a substantially uniform member-receiving space being between the lateral portions and inner portions of the opposed end portions, the loopable member having a member thickness, the member thickness substantially filling the substantially uniform member-receiving space in the first dimension when being looped about the first and second cleat members and the attachment structure for attaching the primary power bank construction to the attachment structure.

3. The totable power source ensemble of claim 2 wherein the central portions extend linearly in opposite directions.

4. The totable power source ensemble of claim 3 wherein the loopable member is characterized by an integrally looped member, the looped member having opposed portions characterized by a zero point of reference and a point opposite the zero point of reference at 180 degrees from the zero point of reference, the zero point of reference and the point opposite the zero point of reference being loopable about the central portions of the first and second cleat members.

5. The totable power source ensemble of claim 4 wherein the integrally looped member is resilient, the resilient looped member being resiliently actuable for engaging the attachment structure and resiliently returnable for forcing the primary power bank construction into engagement with the attachment structure.

6. The totable power source ensemble of claim 1 wherein the primary power bank construction comprises a ventral surface, the ventral surface comprising texturing extending in a third dimension for increasing the coefficient of friction between the ventral surface and an outer structural surface of the attachment structure, the texturing for retarding motion of the ventral surface relative to the outer structural surface.

7. The totable power source ensemble of claim 1 the primary power bank construction comprises a first power bank portion and a second power bank portion, the first power bank portion comprising the primary power source and the power output interface, the second power bank portion comprising the first and second cleat members, the first power bank portion being selectively separable from the second power bank portion.

* * * * *